Aug. 2, 1949.  V. P. DONNER  2,477,969
COUPLING
Filed May 4, 1946
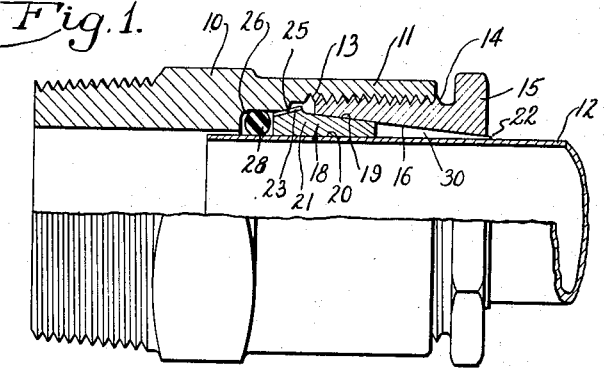
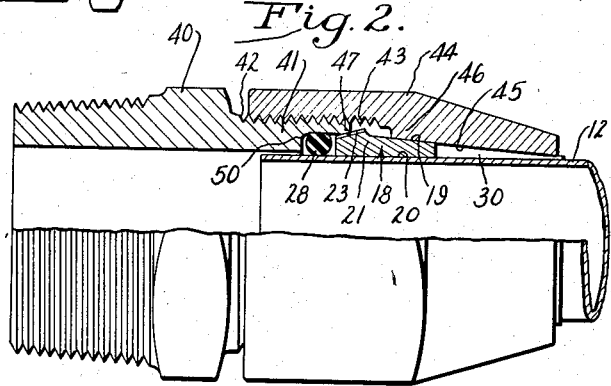
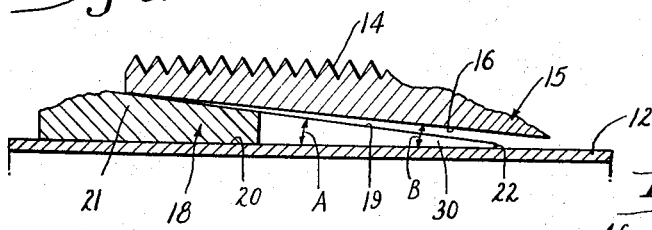
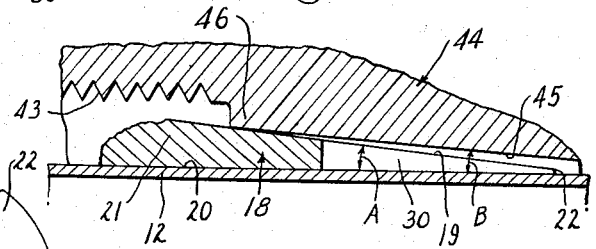
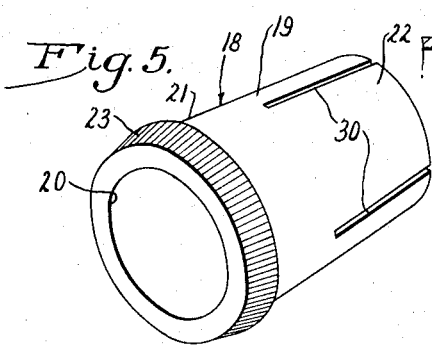
INVENTOR
Verne P. Donner
BY Carlson Pitzner Hubbard & Holfe
ATTORNEYS Patented Aug. 2, 1949

2,477,969

UNITED STATES PATENT OFFICE 2,477,969

COUPLING

Verne P. Donner, Palatine, Ill., assignor to Mid-Continent Metal Products Co., Chicago, Ill., a corporation of Illinois Application May 4, 1946, Serial No. 667,236

4 Claims. (Cl. 285—122)

1

The present invention relates to couplings for fluid conducting tubes or conduits, being in the nature of an improvement over the coupling shown and described in my copending application Serial No. 667,237, dated May 4, 1946, now abandoned.

In the above application, a coupling including telescoped conical sleeves having differentially tapered mating surfaces is disclosed, an object of the structure being the application of sealing force to the outside of a tube or conduit which force is of substantially the same magnitude at all points of contact. It is a general object of the present invention to provide a novel and improved form of coupling in which the advantages of such differential taper are more completely utilized and in which a number of the disadvantages of prior art structures are effectively overcome.

It is another object of the invention to provide a coupling having a conical insert which is readily replaceable to accommodate conduits of different outside diameter, such difference arising, for example, from the use of conduits of different manufacture or because of commercial variations.

It is a further object of the invention to produce a coupling structure including a conical insert and having novel and improved means for preventing the rotation of the insert with respect to the coupling upon the application of tightening force thereto and in which the danger of torsional strain or fracture of the tube is accordingly minimized.

It is still another object of the invention to provide a coupling for fluid under high pressure which is particularly adapted for the easy insertion and effective use of a supplemental O ring or resilient gasket.

Other objects and advantages of the invention will become apparent as the following description proceeds, taken in connection with the accompanying drawings in which:

Figure 1 is a side elevational view in partial section showing a coupling embodying my invention in sealing engagement with a conduit.

Fig. 2 is a view similar to Fig. 1 but showing a modified form of outer sleeve.

Fig. 3 is an enlarged fragmentary view of mating portions of the coupling of Fig. 1 and showing particularly the angular relationship existing at the conical surfaces within the coupling.

Fig. 4 is an enlarged fragmentary view, similar to Fig. 3, but in this instance showing the mating parts of the modified coupling of Fig. 2.

2

Fig. 5 is a detail perspective view of the non-rotatable conical insert employed in both the couplings of Figs. 1 and 2.

While the invention is susceptible of various modifications and alternative constructions, I have shown in the drawings and will herein describe in detail only the preferred embodiments, but it is to be understood that I do not thereby intend to limit the invention to the specific forms disclosed, but intend to cover all modifications and alternative constructions falling within the spirit and scope of the invention as expressed in the appended claims.

Referring now to the exemplary embodiment of the invention shown in Fig. 1, the coupling there illustrated includes a generally cylindrical body 10 having an end portion 11. A sleeve 15 is received within the end portion by engaging threads 13, 14. By threading the sleeve 15 inward of the body 10, an inner sleeve 18 is caused to squeeze a conduit 12 circumferentially in tight gripping engagement with the same. Such squeezing is accomplished by providing generally complemental tapered surfaces on the sleeves 15, 18 so that the inner sleeve 18 is wedged inward as the outer sleeve 15 advances.

As shown in detail in Fig. 5, the conical sleeve 18 has a bore 20 for slidably engaging the conduit 12 and has a tapered surface 19 forming a comparatively heavy cross section in the region 21 presented to the inside of the coupler but tapering to a portion 22 which may approach a feather edge if desired. The heavier portion 21 of the sleeve has a peripheral surface 23 which is preferably tapered oppositely and more abruptly than the conical surface 19. The surface 23 is knurled or formed into a series of sharpened axial ridges to prevent turning of the conical sleeve 18 with respect to the body 10 of the coupler.

A shoulder 25 on the inner surface of the body 10 of the coupler limits the entry of the sleeve 18. Just beyond this shoulder is an annular recess 26 to house an O ring or resilient gasket 28 employed for supplemental sealing purposes.

The angular relationship existing between the conical surface 16 on the rotatable member 15 and the conical surface 19 of the sleeve 18 is shown in greater detail and somewhat exaggerated in the fragmentary view of Fig. 3. In this view it is shown that the angle of taper A of the conical surface 19 with respect to the axis is greater than the angle of taper B of the cooperating surface 16. Thus it is apparent that, as the rotatable member 15 is advanced into engagement with the body 10 of the coupling, contact occurs first at the thickened portion 21 of the conical sleeve. Accordingly, as the rotatable member 15 is increasingly advanced, the pressure exerted inwardly upon the portion 21 of the sleeve will exceed that which is inwardly exerted upon the portion 22.

When the difference in magnitude between the angle A and the angle B is of the proper amount, the inwardly directed force per unit area is approximately proportional to the thickness of the conical sleeve 18 at the point at which such force is exerted. As described more fully in the above mentioned copending application, the resulting inward deformation of the sleeve 18 under such circumstances is approximately the same at all points along the axis producing substantially the same stress upon the conduit at all points of contact.

Where a coupler of this type is constructed of steel, bronze, aluminum, alloy, and the like, the angles A and B may be of approximately six degrees with respect to the axis, corresponding to a conical included angle of about twelve degrees. Employing an angle A which exceeds angle B by one-half degree has been found to produce a substantially constant inward deformation at all points along the axis under conditions encountered in a coupling for aircraft use. The proper amount of differential taper will, of course, vary somewhat, depending on the cross section and type of material used. In a given instance the differential taper required for uniform inward deformation of the sleeve may be predicted from stress and strain considerations, taking into account the modulus of elasticity and cross section of the material used. I have found, however, that the angle may be more expeditiously determined by making a series of conical inserts 18 having incremental values of taper and noting the insert which does not produce a score line or indentation at either end of the sealing surface. The even application of pressure upon the conduit by an insert so determined virtually eliminates localized stresses which may exceed the yield point of the conduit and therefore greatly reduces the possibility of failure under conditions of shock or continued vibration.

Because of the tapered nature of the engaging surfaces 16 and 19, both inwardly-directed and axially-directed components of force are produced. The inwardly-directed component is utilized for urging the sleeve 18 into engagement in the manner described above. The axial component is also effectively utilized in the structure disclosed to prevent rotation of the conical sleeve 18. As shown in Fig. 1, the axial component of force is opposed by the abutment 25 which engages the tapered knurled surface 23. Thus, the greater the force between the tapered surfaces 16 and 19, the more firmly the surfaces 23, 25 are engaged and the more completely the sleeve is locked against rotation.

Whether the abutment 25 is sharp as shown or tapered to coincide with the knurled surface 23, depends upon several factors including the sharpness of the knurl and the relative hardness of the two abutting members. It has been found in practice that where the body 10 is no harder than the sleeve 18, the two members are locked against relative rotation to somewhat better advantage if the abutment 25 presents a sharpened edge. Normally, under such circumstances the knurled surface on first tightening produces locking indentations upon the presented surface of the abutment. If desired, however, the abutment or shoulder 25 may itself be knurled in a manner similar to the insert 18 prior to the assembly of the coupling.

It has been found in practice that the surface 23 should preferably be machined to a taper of approximately six to ten degrees with respect to the axis. In addition to contributing to the accurate centering of the conduit, the use of such relatively steep taper for this surface has the advantage that the conical sleeve 18 may be more readily removed upon disassembly of the coupler. If desired, however, the amount of taper may be increased up to ninety degrees as long as the inner conical sleeve is prevented from turning by use of knurling or the like.

In order to facilitate application and removal of the conical sleeve 18 from the conduit, the sleeve may be divided at the edge portion 22 by longitudinally extending slots 30. Such slots facilitate removal of the sleeve, particularly after the sleeve has once been tightened in sealing engagement with the conduit as shown in Fig. 1. Such slots may also be utilized in the retention of the conical sleeve 18 prior to assembly since the tabs formed between such slots may be bent inwardly into resilient engagement with the conduit. While it is true that the use of slots 30 somewhat reduces the sealing area, nevertheless it has been found that under most normal conditions the remaining sealing surface is still adequate and much more satisfactory than that of prior art couplings.

Referring now to Fig. 2, the embodiment there shown includes the sealing features of Fig. 1 but differs therefrom in the arrangement for applying pressure to the insert 18. In this embodiment the body of the coupling indicated at 40 has a generally cylindrical projecting portion 41 which carries a thread 42 on its outer surface. Such thread is engaged by a corresponding internal thread 43 on a sleeve or nut 44. The latter also includes an internal conical surface 45 arranged adjacent the thread for performing a clamping function similar to that performed by surface 16 in the previous embodiment. Housed within the nut 44 and abutting the end of the cylindrical extension 41 is a mating conical sleeve 18 of the type disclosed in Fig. 5. The knurled surface 23 of the sleeve engages an annular shoulder or abutment 47 in a nonrotative joint in exactly the same manner as described in connection with Fig. 1.

Fig. 4, which is an enlarged fragmentary section of Fig. 2, shows the angular relationship existing between the conical surfaces 19 and 45 in the sleeve and nut respectively. It will be apparent from inspection of Fig. 4 that the portion 46 of the nut 44 engages the conical sleeve 18 first upon advancement of the nut and will apply a correspondingly greater inwardly directed or sealing pressure to the heavier portion of sleeve 18 as the nut is fully advanced.

As in the case of Fig. 1, the O ring 28 which is received in a recess 50 and is in contact with the conduit 12 performs a supplementary or reserve sealing function. In both of the embodiments the application of pressure to the interior of the conduit causes the O ring 28 to move from the position shown to the right and into contact with the presented end 21 of the conical sleeve 18. Since the O ring is prevented from further axial movement, the pressure compacts the resilient structure, tending to cause radial expansion of the same both inwardly against the conduit 12 and outwardly against the wall of the coupling body. With the ring included in the structure as shown, it will be noted that both possible fluid leakage paths, namely, along the surface of the conduit and through the engaging threads are sealed. This is a valuable additional safeguard, particularly where the sealing surfaces are known or suspected to be rough and unsuited to a metal-to-metal seal.

An important practical advantage of the structure shown resides in the ease with which the joint may be assembled prior to tightening. As a first step, the rotatable tightening member (15 or 44) is slipped over the tube. Next, the sleeve 18 is placed on the outside of the conduit with the end of the conduit projecting slightly as shown. Finally, the O ring is stretched over the projecting end of the conduit and the assembly inserted into the body of the coupling and seated on the internal shoulder (25 or 47) provided.

If the conical sleeve 18 were not separate from the body of the coupling as disclosed, it is apparent that the above method of assembly could not be used, and it would be necessary to provide a relatively inaccessible bored internal groove in the coupling body. The O ring under such conditions would have to be inserted into the coupling before the conduit, thereby running the chance that the sharp edges of the conduit may cut or displace the ring.

Another inherent advantage of my coupling structure, which may not be immediately apparent upon examination of the drawings, resides in the fact that a wide variety of inserts 18 may be selectively employed with a standard coupling body 10 to adapt the coupling body to a relatively wide range of conduit outer diameters. The latter is very useful where it is not known, at the time the body of the coupling is incorporated into a given piece of apparatus, with what make or diameter of tubing the apparatus is to be used. A selected sleeve may also be used where wide commercial variations in the outer diameter of tubing are encountered. Under such conditions a conical sleeve is selected which snugly embraces the conduit prior to the insertion of the conduit within the coupling.

I claim as my invention:

1. A coupler for the pressure tight coupling of a tube comprising a cylindrical tube receiving member, a conical sleeve having a cylindrical bore therein adapted to surround the end portion of said tube in closely fitting relation and having a conical outer surface, a thickened end portion on said conical sleeve in abutting relation with said cylindrical member, means including a rotatable sleeve having an internal conical surface for telescoping over said conical sleeve, the conical surface on said conical sleeve having a greater angle with respect to the axis than the conical surface on said rotatable sleeve, said rotatable sleeve threadedly engaging said cylindrical member to produce wedging engagement between said conical surfaces, the abutting end of said conical sleeve being tapered oppositely from said conical surface thereon and having a knurled surface to prevent relative rotation of said conical sleeve and said cylindrical member upon turning of said rotatable sleeve.

2. A coupler for the pressure tight coupling of a tube comprising a cylindrical tube receiving member presenting a relatively sharp annular edge, a conical sleeve having a cylindrical bore adapted to surround the end portion of said tube in closely fitting relation and including a thickened end portion abutting said cylindrical member, means including a rotatable sleeve having an internal conical surface telescoped over said conical sleeve, said rotatable sleeve threadedly engaging said cylindrical member to produce wedging engagement with said conical sleeve, the thickened end portion of said conical sleeve having a knurled surface for engaging said sharp annular edge to prevent relative rotation of said conical sleeve and said cylindrical member upon turning of said rotatable sleeve.

3. A coupler for the pressure tight coupling of a tube comprising a cylindrical tube receiving member having an annular recess defining an internally facing annular edge, a conical sleeve having a cylindrical bore adapted to surround the end portion of said tube in closely fitting relation and including a thickened end portion abutting the inwardly directed annular edge of said cylindrical member, means including a rotatable sleeve having an internal conical surface for telescoping over said conical sleeve and mating therewith, said rotatable sleeve threadedly engaging said cylindrical member to produce wedging engagement with said conical sleeve, said thickened end portion of said conical sleeve being tapered with respect to the axis for wedging engagement with said annular edge and having a surface with generally axial grooves formed therein to prevent relative rotation of said conical sleeve and said cylindrical member upon turning of said rotatable sleeve.

4. A coupler for the pressure tight coupling of a tube comprising a cylindrical tube receiving member having an external thread, a conical sleeve having a bore adapted to closely surround the terminal portion of said tube and a conical outer surface, the thicker end portion of said conical sleeve seating on said cylindrical member, a nut having a threaded inner surface and a conical inner surface adjacent thereto, the included angle of the conical surface on said sleeve exceeding the included angle of the conical surface on said nut, said nut being adapted to bring said conical surfaces into intimate telescoping engagement upon engagement of said threads, at least one of the abutting surfaces being knurled to inhibit rotation of said conical sleeve with respect to said cylindrical member as said unit is advanced.

VERNE P. DONNER.

REFERENCES CITED

The following references are of record in the file of this patent:

UNITED STATES PATENTS

| Number | Name | Date |
| --- | --- | --- |
| 433,489 | Potts | Aug. 5, 1890 |
| 587,347 | Waite | Aug. 3, 1897 |
| 1,863,870 | Moore | June 21, 1932 |

FOREIGN PATENTS

| Number | Country | Date |
| --- | --- | --- |
| 485,154 | Great Britain | May 16, 1938 |